United States Patent [19]
Pratsinis et al.

[11] Patent Number: 5,861,132
[45] Date of Patent: *Jan. 19, 1999

[54] VAPOR PHASE FLAME PROCESS FOR MAKING CERAMIC PARTICLES USING A CORONA DISCHARGE ELECTRIC FIELD

[75] Inventors: Sotiris Emmanuel Pratsinis; Srinivas Vemury, both of Cincinnati, Ohio; George P. Fotou, Albuquerque, N. Mex.; Andreas Gutsch, Altenstadt, Germany

[73] Assignee: University of Cincinnati, Cincinnati, Ohio

[*] Notice: The term of this patent shall not extend beyond the expiration date of Pat. No. 5,698,177.

[21] Appl. No.: 923,656

[22] Filed: Sep. 4, 1997

Related U.S. Application Data

[63] Continuation of Ser. No. 488,694, Jun. 8, 1995, Pat. No. 5,698,177, which is a continuation-in-part of Ser. No. 373,980, Jan. 18, 1995, abandoned, which is a continuation-in-part of Ser. No. 299,204, Aug. 31, 1994, abandoned.

[51] Int. Cl.$^6$ .................. C01G 23/047; C01B 33/12; C01B 21/00; C01B 31/30
[52] U.S. Cl. .................. 423/613; 423/337; 423/625; 423/608; 423/622; 423/618; 423/289; 423/351; 423/439
[58] Field of Search .................. 423/613, 337, 423/625, 608, 622, 618, 289, 351, 439; 501/87, 96.1

[56] References Cited

U.S. PATENT DOCUMENTS

| | | | |
|---|---|---|---|
| 2,779,662 | 1/1957 | Frey | 23/202 |
| 2,957,753 | 10/1960 | Nelson et al. | 23/202 |
| 2,980,509 | 4/1961 | Frey | 23/202 |
| 3,068,113 | 12/1962 | Strain et al. | 106/300 |
| 3,365,274 | 1/1968 | Carpenter et al. | 23/202 |
| 3,414,379 | 12/1968 | Wiggington et al. | 23/202 |
| 3,419,351 | 12/1968 | Zirngibl et al. | 23/140 |
| 3,532,462 | 10/1970 | Zirngibl et al. | 23/202 |
| 3,541,379 | 11/1970 | Holden | 313/231 |
| 3,558,274 | 1/1971 | Holden | 23/202 |
| 3,574,546 | 4/1971 | Skrivan | 23/202 |
| 3,640,745 | 2/1972 | Darr et al. | 106/300 |
| 3,642,442 | 2/1972 | Hoekje et al. | 23/202 |
| 3,954,945 | 5/1976 | Lange et al. | 423/336 |
| 4,010,090 | 3/1977 | Fey et al. | 204/170 |
| 4,091,779 | 5/1978 | Saufferer et al. | 123/119 |
| 4,801,411 | 1/1989 | Wellinghoff et al. | 264/7 |
| 4,803,056 | 2/1989 | Morris et al. | 422/156 |
| 4,892,712 | 1/1990 | Robertson | 422/186 |
| 5,163,626 | 11/1992 | Urwin et al. | 241/1 |
| 5,196,181 | 3/1993 | Hartman | 423/613 |
| 5,198,403 | 3/1993 | Brand et al. | 502/204 |
| 5,204,083 | 4/1993 | Magyar et al. | 423/613 |

FOREIGN PATENT DOCUMENTS

| | | |
|---|---|---|
| 595078 | 5/1994 | European Pat. Off. . |
| 4400829 | 12/1994 | Germany . |
| 57-209845 | 12/1982 | Japan . |
| 948881 | 8/1982 | U.S.S.R. . |
| 1781260 | 12/1992 | U.S.S.R. . |
| 707389 | 4/1954 | United Kingdom . |
| 916250 | 1/1963 | United Kingdom . |
| 1105605 | 3/1968 | United Kingdom . |
| 2252707 | 8/1992 | United Kingdom . |

OTHER PUBLICATIONS

Formenti, M., et al; in Aerosols and Atmospheric Chem., G.M. Hidy, ed., Academic Press, New York, pp. 45–55 (1972), no month.
George, A.P., et al, Farad. Symp. Chem. Soc., 7: 63 (1973), no month.
Ollis, et al, Environ. Sci. Technol., 25 (9): 1523 (1991), no month.
Okamoto, et al, Bull. Chem. Soc. Jpn., 58: 2015 and 2023 (1985), no month.
Hardesty and Weinberg, Proceedings of The Fourteenth Symp. (International)on Combustion, the Combustion Institute, 907 (1973), no month.
Haynes, et al, Proceedings of the Seventeeth Symposium (International) on Combustion, The Combustion Institute, 1365 (1979), no month.
Katz, et al., Proceedings of the Twenty–Third Symposium (International) on Combustion, The Combustion Institue, 1733 (1990), no month.
Lee, et al., J. Solid State Chem., 106: 288 (1993), no month.
Xiong, Y., et al., J. Colloid Interface Sci., 153: 106 (1992), no month.
Lin, C.H., Aerosol Sci. Technol., 13: 434 (1990), no month.
Ulrich, G.D., C&EN 62(8): 23 (1984), Aug.
Akhtar, M.K., et al., Nanostructured Mat., 4: 537 (1994), no month.
Xie, L., et al., Twenty–Fourth Symp. (International) on Combustion, The Combustion Institute, 1059 (1992), no month.
Hung, et al., J. Mater. Res., 7(7): 1861 (1992), Jul.
Fotou, G.P., et al., Chem. Eng. Sci., 49: 1651 (1994), no month.

Primary Examiner—Steven Bos
Attorney, Agent, or Firm—Frost & Jacobs

[57] ABSTRACT

A gas phase process for the production of titanium dioxide powders having well-controlled crystalline and surface area characteristics is disclosed. In this process, which is preferably carried out in a laminar diffusion flame reactor, vapor phase TiCl$_4$ and oxygen are mixed in a reaction area which is heated externally. The titanium dioxide powder formed is then collected. It is preferred that the heat source used be a hydrocarbon fueled (e.g., methane) flame. Optionally, a vapor phase dopant (such as SiCl$_4$) may be added to the reaction mixture to desirably affect the physical properties of the titanium dioxide produced. In a particularly preferred embodiment, a corona electric field is positioned across the area where the combustion reaction takes place (i.e., the reaction area). High anatase, high surface area titanium dioxide powders made by this process are excellent photo-catalysts. The products of this process and the use of those products as photocatalysts are also disclosed. This process is also useful for producing other ceramic powders (such as silicon dioxide and tin oxide), as well as pure metallic or alloy powders.

7 Claims, No Drawings

VAPOR PHASE FLAME PROCESS FOR MAKING CERAMIC PARTICLES USING A CORONA DISCHARGE ELECTRIC FIELD

CROSS-REFERENCE TO RELATED APPLICATION

This application is a continuation of U.S. patent application Ser. No. 08/488,694, filed Jun. 8, 1995, now U.S. Pat. No. 5,698,177, which is a continuation-in-part of U.S. patent application Ser. No. 08/373,980, filed Jan. 18, 1995, abandoned, which is a continuation-in-part of U.S. patent application Ser. No. 08/299,204, filed Aug. 31, 1994, now abandoned.

CONTRACTUAL ORIGIN OF THE INVENTION

The United States Government has rights in this invention pursuant to Contract No. CTS 8957042 between the National Science Foundation and the University of Cincinnati.

TECHNICAL FIELD

This development relates to a vapor phase process for the production of titanium dioxide, silicon dioxide and aluminum oxide powders and other ceramic powders having well-controlled crystalline and surface area characteristics. The materials produced are especially useful as catalysts in photochemical reactions. The process is also useful for producing metallic and alloy powders.

BACKGROUND OF THE INVENTION

Titanium dioxide (titania) is extensively used in pigments, inorganic membranes, semi-conductors, and as a photocatalyst in gas and water purification processes. More than two million tons of titanium dioxide are produced annually; most of it is manufactured by aerosol processes which provide the advantages of small particle size, narrow size distribution, nearly spherical particles and high purity. Aerosol processes also are energy efficient and avoid the treatment of large liquid volumes associated with traditional wet chemistry processes. On the other hand, conventional aerosol processes are very complex and involve many physicochemical phenomena and mechanisms, such as chemical reaction, particle nucleation, condensation, coagulation, aggregation, heat and mass transfer, and thermophoresis. The fundamentals of these processes are not well understood and, as a result, the processes are difficult to control precisely. This makes design, operation and control of industrial reactors to carry out these processes more of an art than a science, relying heavily on experience and empiricism.

The use of photocatalysis as a purification process for both gas and liquid media has been of growing interest over the past decade. The photocatalytic destruction of organic contaminants is simple, low cost and fast and, therefore, attractive for a variety of purification applications. This process involves illumination of catalytic particles with near UV-light to promote photoexcitation of valence band electrons and holes. These electrons and holes migrate to the surface of the catalytic particles and participate in reduction/oxidation (redox) reactions with adsorbed species. These redox reactions produce highly reactive hydroxyl radicals which are responsible for the oxidation and in some cases the mineralization (complete oxidation to carbon dioxide, water and/or HCl) of the organic species. Among the oxide semiconductors which have been used for the photocatalytic destruction of organic pollutants, the anatase crystalline phase of titanium dioxide is the most effective because of its high photoactivity and stability.

Much of the current work on photocatalysis has been done using commercially available titanium dioxide powders. Though these powders are, in some cases, treated to improve their photocatalytic properties, they are generally not originally produced for this application. As a result, the most important properties for photocatalysis, i.e., specific surface area and crystalline phase composition, are not generally optimized during powder manufacture. Further, as discussed above, many of the processes currently used to produce titanium dioxide are only able to control such characteristics as surface area and phase composition with relative difficulty and little precision.

It was in this context that the present invention was made. This invention provides an effective, easily controlled process for preparing titanium dioxide (and other ceramic) powders. Particularly, the present invention allows for the effective controlling of the level of anatase phase and the surface area of the powder formed. By being able to vary and optimize anatase content and surface area independently of each other, with relative ease, the materials produced are useful for any use of titanium dioxide and are particularly useful as catalysts for photooxidation reactions.

Formenti, M., et al, in Aerosols and Atmospheric Chemistry, G. M. Hidy, ed., Academic Press, New York, pages 45–55 (1972), prepared titanium dioxide particles from the oxidation of $TiCl_4$ in an oxygen-hydrogen diffusion flame. $TiCl_4$ was introduced into the reaction by aspiration making flow rates difficult to control. They found that the morphology of the particles formed was a function of precursor concentration and residence time in the flame. Dopants and electric fields were not used in the preparation of titanium dioxide.

George, A. P., et al, Farad. Symp. Chem. Soc., 7: 63 (1973), investigated titanium dioxide production in premixed flames and found that the product particles had a self-preserving size distribution.

Great Britain Patent Specification 2,252,707, Tioxide Group Services, Ltd., published Aug. 12, 1992, describes a process for the decomposition of degradable organic materials (e.g., chlorophenol) using UV light and a photodecomposition catalyst which comprises a disk having anatase titanium dioxide adhered to it. It is disclosed that the titanium dioxide preferably has a high surface area in the range from 20–200 $m^2/gm$. No process is disclosed for making this titanium dioxide material. See also, U.S. Pat. No. 5,163,626, Urwin, et al, issued Nov. 17, 1992.

Ollis, et al, Environ. Sci. Technol., 25 (9): 1523 (1991), describes the use of photocatalysis to destroy contaminants in water. Titanium dioxide is taught to be an effective photocatalyst but there is little discussion of the physical characteristics of the titanium dioxide used. It is taught that the titanium dioxide used has a particle size of from 0.1 to 30 $\mu m$.

Okamoto, et al, Bull. Chem. Soc. Jpn., 58: 2023 (1985), discusses the photocatalytic decomposition of phenol using anatase titanium dioxide powder. The average particle diameter of the powder is between 0.76 and 1.88 $\mu m$.

U.S. Pat. No. 4,892,712, Robertson, issued Jan. 9, 1990, describes a reactor for fluid purification using photocatalysis. Anatase titanium dioxide is taught as being useful as a photocatalyst. However, there is no specific discussion of the physical characteristics of the titanium dioxide used, and specifically there is no discussion of surface area.

U.S. Pat. No. 5,198,403, Brand, et al, issued Mar. 30, 1993, discusses the production of a catalyst material using titanium dioxide which is completely or predominantly in the anatase phase and has a surface area of from 40 to 500 $m^2/gm$, preferably from 75 to 150 $m^2/gm$.

The introduction of ions into the reactants during production of carbon black has been taught to be effective in reducing the particle size of the product formed. The ions can be produced either by the addition of alkali metals to the reaction stream (Haynes, et al., Proceedings of the Seventeenth Symposium (International) on Combustion, The Combustion Institute, 1365 (1979)) or by using an electric/magnetic field (Soviet Patent 1,781,260, issued Dec. 15, 1992). Neither of these disclosures suggests that the presence of ions has any effect on the crystalline structure of the carbon black product.

It has also been suggested that by applying an electric field to ionize reactants before they enter the combustion area in the production of silicon dioxide, small particle size product may be produced. See, Soviet Patent 948,881, issued Aug. 7, 1982, and Hardesty and Weinberg, Proceedings of the Fourteenth Symposium (International) on Combustion, The Combustion Institute, 907 (1973). There is no teaching in these disclosures that this technique would have any effect on the crystalline structure of the silicon dioxide product.

The production of titanium dioxide in a diffusion flame reactor using an electric field applied by fixed flat screen electrodes located outside the combustion area has been taught. See, Katz, et al., Proceedings of the Twenty-Third Symposium (International) on Combustion, The Combustion Institute, 1733 (1990). This research suggested that the use of such electric fields resulted in increased particle size of titanium dioxide.

SUMMARY OF THE INVENTION

The present invention relates to a process for preparing titanium dioxide powder comprising the steps of:

a) mixing vapor phase $TiCl_4$ and $O_2$ in a reaction area;

b) externally heating said mixture in said reaction area; and c) collecting the titanium dioxide powder formed.

It is preferred that this process be carried out in a diffusion flame reactor using combustion of a hydrocarbon fuel, particularly methane, to provide the flame. Preferably a dopant (such as $SiCl_4$) may be added to the reaction mixture to desirably affect the properties of the titanium dioxide produced. It is also preferred that the vapor phase $TiCl_4$ be added to the reaction by bubbling an inert gas, such as argon, through liquid $TiCl_4$ and directing that gas to the reaction area. In a particularly preferred embodiment, a corona electric field is located across the reaction area where the combustion takes place. The use of this electric field maximizes production of particles having high surface area and low rutile (high anatase) content. The product made using the process of the present invention and the use of that product as a photocatalyst are also claimed herein. The process of the present invention, particularly the embodiment which utilizes the corona electric field, may be used to form a wide variety of ceramic powders and even metallic or alloy powders.

DETAILED DESCRIPTION OF THE INVENTION

The present invention relates to a process for the synthesis of titanium dioxide powders by $TiCl_4$ oxidation/hydrolysis. In chemical terms, the reactions being carried out in the present invention are as follows:

$$TiCl_4 + O_2 \rightarrow TiO_2 + 2Cl_2$$

$$TiCl_4 + 2H_2O \rightarrow TiO_2 + 4HCl$$

The process defined herein consists of three basic steps: (1) mixing the reactants together, (2) externally heating the reaction mixture, and (3) collecting the titanium dioxide powder formed in the reaction. The precise details of these steps are set forth below. Although specific executions and examples are discussed in this application, it is envisioned that the present invention encompasses the full range of obvious variants of those specifically disclosed herein. All percentages and ratios given herein are "by weight" unless otherwise specified.

Mixing Step

The mixing step takes place in a reactor. This reactor may encompass any vessel or area in which the reactants ($TiCl_4$, $O_2$, and the optional dopant) can be mixed in their vapor phase and heated externally. Flame reactors are a preferred class of such reactors. In a flame reactor the reactants are present in the vapor phase and are heated by a flame. An example of such a reactor is a pre-mixed flame reactor in which the various reactants are mixed together prior to being introduced into the flame where the reaction takes place. This type of reactor is known in the art and, for example, is described in George, A. P., et al, Farad. Symp. Chem. Soc., 7:63 (1973), incorporated herein by reference. Another type of reactor is a turbulent reactor. Preferred for use in the present invention is a diffusion flame reactor (particularly a laminar diffusion flame reactor) because it provides a higher quality titanium dioxide product by allowing better control of the reaction conditions. Laminar diffusion flame reactors of the type useful in the present invention are described in Fotou, Pratsinis and Baron, Coating of Silica Fibers by Ultrafine Particles in a Flame Reactor, Chem. Eng. Sci., 49: 1651 (1994) (see especially FIG. 1 and the first paragraph of the Experimental section), and Formenti, et al., in Aerosols and Atmospheric Chemistry, G. M. Hidy, ed, Academic Press, New York, pages 45–55 (1972), both incorporated by reference herein. The laminar diffusion flame reactor generally consists of five concentric quartz tubes 1 mm thick. The diameter of the central tube is 2 mm and the spacing between successive tubes is 1 mm. The number of concentric tubes in the reactor and their size can be varied depending upon the requirements of the particular reaction. The design of this reactor is similar to the torches employed in the manufacture of optical fibers as well as in the synthesis of fumed silica. See, Bautista, J. R., et al, J. Aerosol Sci. 22: 667 (1991).

The $TiCl_4$ reactant is introduced into the reactor in the vapor phase. Any method of providing $TiCl_4$ in the vapor phase will work in the present invention (e.g., aspiration or aerosolization). It is preferred, however, that the $TiCl_4$ vapor be generated by bubbling an inert gas through liquid $TiCl_4$ and directing that gas (containing $TiCl_4$ vapor) into the reaction area. This procedure allows for precise control of $TiCl_4$ flow rate and concentration in the reaction area. As used herein, the term "inert" means that the gas which is used is inert to chemical reactions with $TiCl_4$ and the other reactants defined herein. The gas is also preferably anhydrous. Preferred gases for use in this capacity include argon, nitrogen, helium, krypton, chlorine, and mixtures thereof. Particularly preferred for use in the present invention is argon.

When a laminar diffusion flame reactor is used in the present invention, the argon gas/$TiCl_4$ vapor is preferably directed through the central tube of the flame reactor. The gas $TiCl_4$ flow rates utilized in the process of the present invention are generally from about 100 $cm^3$/min to about 300 $cm^3$/min, and preferably are from about 150 $cm^3$/min to about 250 $cm^3$/min. This flow rate (together with the liquid $TiCl_4$ temperature) essentially defines the concentration of $TiCl_4$ which is present in the reaction area. The $TiCl_4$ vapor concentration ranges (in the reaction area) which are useful in the present invention are from about $7\times10^{-5}$ mol/min to about $1\times10^{-2}$ mol/min, and preferably are from about $1\times10^{-4}$ mol/min to about $5\times10^{-3}$ mol/min. The actual concentration of $TiCl_4$ vapor in the argon gas may be controlled by heating the $TiCl_4$ liquid through which the argon gas is bubbled. The higher the temperature utilized, the greater the $TiCl_4$ vapor concentration achieved. In this regard, it is preferred that the $TiCl_4$ through which the argon is flowed or bubbled has a temperature of from about 20° C. to about 100° C.

The $TiCl_4$/argon flow rate (together with the flow rates for oxygen, fuel and dopant, if used) helps determine the residence time of the reactants in the reaction area. This residence time affects the characteristics of the final titanium dioxide product formed. A higher flow rate results in a shorter residence time in the reaction area which results in a larger specific surface area for the product produced. This is counterbalanced by the fact that an increase in the $TiCl_4$ concentration in the reaction area will result in a decrease in the specific surface area of the product formed. Thus, residence time and $TiCl_4$ concentration must be balanced in order to obtain the desired titanium dioxide surface area.

The other required reactant utilized in the process of the present invention is oxygen gas. Oxygen may be introduced into the system in any form, such as pure oxygen, but is preferably introduced into the system as filtered air. Any conventional filtering process may be used. The oxygen is preferably directed into the diffusion flame reactor in the second tube (i.e., the tube immediately adjacent to the central tube which is carrying the $TiCl_4$ reactant). When filtered air is used, its flow rate into the reactor is generally from about 0.3 to about 5.5 l/min, preferably from about 0.5 to about 2.5 l/min. The higher the flow rate of the air (oxygen) entering the reactor, the lower the residence time of the reactants in the reaction area and the larger the surface area of the titanium dioxide formed.

The reaction mixture which is utilized in the present invention may also optionally include a dopant material, in vapor phase, to positively affect the physical attributes of the titanium dioxide formed. The dopant may either be premixed with the $TiCl_4$ reactant prior to entry into the reaction area or the $TiCl_4$ reactant and the dopant may be mixed in the reaction area. It is preferred that the $TiCl_4$ reactant and the dopant be premixed before they are introduced in the reaction area. In a laminar diffusion flame reactor, therefore, it is preferred that the dopant vapor also be introduced into the central core of the reactor.

Dopants which are useful in the present invention include silicon, phosphorus, germanium, boron, tin, niobium, chromium, silver, gold, palladium, aluminum, and mixtures thereof. Preferably, these dopants are introduced into the system as chlorides although other compounds may be used as long as they are liquids, may be introduced into the reaction system in the vapor phase, and contain the desired dopant element defined above (e.g., organo-metallic compounds may be used). Some of these dopant compounds become oxides during the course of the reaction. The use of tin or aluminum in the reaction tends to promote the formation of rutile crystalline phase in the titanium dioxide product. On the other hand, the use of $SiCl_4$ as the dopant in the process of the present invention tends to maximize the presence of the anatase phase in the final product and also minimizes particle size (which accordingly maximizes the specific surface area of the final product). In selecting the amount of dopant to be used in the process, it is generally advisable to use the smallest amount of dopant which creates the desired effect. For example, it is preferred, when silicon tetrachloride ($SiCl_4$) dopant is used, that the reaction mixture contain from about 5% to about 10% $SiCl_4$ on a molecular basis when compared to the amount of $TiCl_4$ in the system. It is possible to use $SiCl_4$ levels outside of this range although the products produced by the reaction will not be optimal for photocatalysis use.

The dopant is generally introduced into the system in the same way that the $TiCl_4$ reactant is. Specifically, it is preferred that the vapor phase dopant be introduced by bubbling an inert gas (i.e., inert to the particular dopant and other reactants utilized in the process) through the liquid dopant and that the dopant vapor/gas then be directed into the reaction area. Preferred gases for use in that regard include argon, nitrogen, helium, krypton, chlorine, and mixtures thereof. Argon is particularly preferred. The concentration of the dopant material in the reaction zone will depend upon the flow rate of the gas used, as well as on the temperature of the dopant through which the gas is bubbled. In that regard, it is preferred that the flow rate of the argon through the dopant liquid be from about 3 to about 50 $cm^3$/minute, that the concentration of the dopant entering the reaction area be from about $7\times10^{-6}$ to about $1.4\times10^{-4}$ mol/minute, and that the temperature of the dopant liquid through which the argon is flowed or bubbled be from about −13° to about 25° C.

Heating Step

Once the $TiCl_4$ vapor, the $O_2$ and the optional dopant are combined in the reaction area, they are heated via external heating of the reaction area. Any source of heat may be used in the present invention. For example, electrical resistance may be used to heat the reaction area. In a flame reactor (such as a diffusion flame reactor) the heat is provided by combustion. In the laminar diffusion flame reactor, a fuel is fed into the reactor in a sleeve which completely surrounds the reactants being fed into the reactor. Therefore, when the fuel is ignited in the reaction area it is burning essentially at the periphery of the reactants which are being mixed together in the center of the flame (i.e., the heating is external to the reaction area). It has been found that when this configuration is used (i.e., the fuel is fed into a laminar diffusion flame reactor in a sleeve which completely surrounds the reactants ($TiCl_4/O_2$) being fed into the reactor), a significant reduction in both particle size and rutile content of the product formed takes place. In addition, by using this configuration and manipulating the reaction conditions to lower precursor concentrations, lower flame residence times and lower flame temperatures, very fine anatase titania powders can be produced.

It is preferred that the fuel used in the process of the present invention be a hydrocarbon material, preferably methane, acetylene, propane, ethane, ethylene, or mixtures thereof. Methane is the most preferred fuel for use herein. The flame which is utilized in the reaction should be as blue as possible indicating complete combustion of the fuel with very little soot present. The flame generally has a temperature between about 1100K and about 2000K.

The presence of water vapor in the reaction area promotes the formation of anatase phase in the titanium dioxide product formed and, therefore, is desirable in the present invention. Water vapor forms in situ during the combustion process which is one of the reasons why combustion is the preferred source of heat in the present invention. If a non-combustion heat source is used in the present invention, water vapor can be added to the reaction mixture through the reactor.

The fuel is introduced into the reaction area at a rate of from about 125 to about 400 cm³/min, preferably from about 150 to about 300 cm³/min. The higher the flow rates of the fuel and oxygen entering the reactor, the higher the temperature in the reaction area. Increased fuel and oxygen flow rates also decrease residence time. The effects of fuel (e.g., methane) flow on the final product are controllable but relatively complex. At relatively long residence times, the surface area of the powders formed decreases. At medium residence times, the methane flow rate has little effect on the particle size, while at short residence times, the surface area of the product formed increases with methane flow rate. The flame temperature increases with increasing methane flow rate resulting in a higher sintering rate of particles formed and, hence, the larger particle size (lower surface area). Thus, in general, higher flame temperatures result in both increased particle size and rutile content in the product produced.

Collection Step

The final step in the process of the present invention is the collection of the titanium dioxide powder formed. This may be done in many ways known in the art, such as by collection through a filter or on a drum. It is preferred that the powder be collected on a metal (e.g., steel or nickel) plate located just outside the reaction area and placed such that the gases flowing through the reaction area or the air currents around the flame direct the particles formed to the plate. It is preferred that the plate be located from about 3 and about 12 cm, more preferably from about 4 and about 10 cm, above the mouth of the burner. The particles formed may also be collected by a filter, such as a glass fiber filter, which may optionally be aided by a vacuum pump. The collection should take place at a temperature which is lower than the flame temperature.

In controlling the characteristics of the titanium dioxide powder formed by the process, it is important to note that there are essentially two key variables in the process: reaction temperature and residence time in the reaction area. The temperature is, of course, controlled in any conventional way (e.g., identity of fuel, flow rate of fuel, flow rate of oxygen). The residence time in the reaction area is controlled based upon flow rates of the $TiCl_4$ vapor, the oxygen, the fuel and the dopant (if used) into the reaction area: the higher the collective flow rates of these items, the shorter the residence time will be in the reaction area. When the reaction temperature is relatively low (i.e., from about 1100 to about 1500K) and/or the residence time is relatively short (i.e., from about 0.075 to about 0.1 second, a collective flow rate of from about 1900 to about 2800 cm³/min), the titanium dioxide product formed generally will have a high anatase phase composition and a high surface area making it excellent for use as a photocatalyst. On the other hand, where the residence time of the reactants in the reaction area is relatively long (i.e., from about 0.12 to about 0.5 second, collective flow rate from about 500 to about 1500 cm³/min), particularly where the reaction temperature is relatively high (i.e., from about 1100 to about 2000K, particularly from about 1500 to about 2000K), the titanium dioxide formed contains a high rutile phase composition and a relatively low surface area.

In a particularly preferred embodiment of the present invention, a corona discharge electric field is located across the reaction area where the combustion takes place (i.e., where the particles are formed). This procedure allows for the formation of excellent quality titanium dioxide particles, having high surface area and low rutile (high anatase) content, without requiring the use of the dopant materials described above. The fact that this result can be achieved without using dopants yields a process which is less costly than one which requires dopants, and produces a product which has a higher degree of purity than if dopants were used. This process can be applied broadly in vapor phase flame generation reactions to form metallic, alloy and ceramic particles, such as silica, titania, alumina, borides, nitrides and carbides. Examples of such materials include metals (iron, aluminum, alloys) and ceramic oxides and their mixtures, such as tin oxide, aluminum oxide (alumina), silicon oxide (silica), chromium oxide, iron oxide, germanium oxide, vanadium oxide, zinc oxide, zirconium oxide, copper oxide or barium oxide. Mixed metal oxides, such as superconductors, can also be prepared. These materials are formed using vapor phase reactions known in the art with the improvement of forming the particles in the presence of a corona discharge electric field. The process is especially useful in preparing silicon oxides and titanium dioxide, most especially titanium dioxide (titania) in the manner described in the present application.

The characteristics of the electric field utilized (e.g., its location, polarity and strength) can have a significant impact on the properties of the titanium dioxide formed. Specifically, the electric field must be a corona (i.e., a discharge of electricity between point electrodes caused when the voltage gradient between those electrodes exceeds a certain critical value) having field lines limited to a narrow region. A broader electric field, such as one between two plate electrodes, will not provide the degree of control required to achieve the benefits of the present invention. The electrodes utilized in this embodiment of the present invention are generally in the form of needles made of an electrically conducting material, such as stainless steel, carbon, tin, titanium, preferably stainless steel, which come to a sharp point (from about 25 to about 150 $\mu$m, preferably from about 50 to about 100 $\mu$m, in diameter) on at least one end. The use of smaller diameter needles permits the formation of the corona using lower voltages.

The electrodes are generally placed in a horizontal plane (i.e., parallel to the ground, such that the direction of the electric field is approximately perpendicular to the flow of the reactants), one on each side of the flame with a gap between them where the combustion takes place. Generally, the distance between the tips of the electrodes will be from about 30 to about 60 mm, preferably from about 35 to about 45 mm. The tips of the electrodes should be placed outside the flame to minimize corrosion of the electrode tip. Preferably the tip of each electrode is placed from about 4 to about 10 mm outside the flame. If the tips of the electrodes are placed too far apart, the voltage required to achieve the corona will be too great for practical use. The electrodes may be positioned anywhere on the vertical axis within the reaction (combustion) area. However, best results are obtained when the electrodes are placed at the same height as the hottest part of the flame (i.e., at the point where the ceramic (e.g., $TiO_2$) particles are actually being formed). This generally means that the electrodes are located from about 0.5 to about 30 mm, particularly from about 1 to about 20 mm, most preferably about 1 mm to about 5 mm, above the mouth of the burner. Positioning the electrodes closer to the burner mouth results in the formation of particles which are smaller (i.e., have increased surface area).

While not intending to be bound by theory, it is believed that the electric field operates on the reaction in the following manner. The metallic or ceramic (e.g., titanium dioxide) particles, as they are formed in the flame, are charged by the electric field. The interaction between the particle charges and the electric field repels the particles out of the high temperature area quickly resulting in a finer/smaller particle than would have been formed had the particle remained in the high temperature area for a longer period of time. The charged particles then reagglomerate in a lower temperature area (for example, above the flame). This results in particles which are finer in size (thereby having a larger specific surface area) and which contain less rutile (and therefore more anatase) crystalline phase. In addition, the corona (particularly at higher voltages) acts to flatten the flame as a result of the corona wind effect. This results in shorter residence time in the flame which causes the formation of particles which are smaller in size and, in the case of $TiO_2$, have a higher anatase content. It is useful to contrast this effect with the one described in Katz, et al, Proceedings of the Twenty-Third Symposium (International) on Combustion, The Combustion Institute, 1733–1738 (1990). In Katz, et al, the electric field was provided by flat metal screens which charged the reactants before they entered the reaction area. By the time the particles entered the reaction area the charges on them had dissipated to a significant extent. In addition, the placement of the electrodes in Katz, et al made the repulsion mechanism described above difficult, if not impossible, to achieve. It is interesting to note that Katz, et al, reported that the presence of the electric field made the particles formed larger.

The electric field used in this preferred embodiment may be unipolar (positive or negative) or bipolar. It is produced using a direct current. Any conventional DC power source may be used. To produce a unipolar corona, one electrode is connected to the DC power supply (either positive or negative) and the other electrode is connected to the ground. For a bipolar corona discharge, one electrode is connected to the positive DC power supply and the other electrode is connected to the negative DC power supply. The applied voltages useful in this embodiment of the present invention are from about 2 to about 15 kV, preferably from about 4 to about 12 kV. As the voltage increases within these ranges, the particles formed tend to be smaller and, in the case of $TiO_2$, have a higher anatase content. The required (e.g., the minimum voltage required to get a corona and to get an effect on the reaction) and optimum voltages will, of course, vary depending upon the placement and distance between the electrodes, the composition of the electrodes and the specifics of the reaction involved. Generally, unipolar fields tend to give better results than bipolar fields. Where the flame has positive charge characteristics, a positive electric field tends to give better results. When a flame has negative charge characteristics, a negative electric field tends to give better results.

In general, with both positive and negative electric fields, the rutile content of the particles formed decreases as the applied voltage increases. The specific surface area of the particles formed increases with increasing voltage between the electrodes (for both unipolar and bipolar fields).

By manipulating the conditions in the reaction of the present invention, and particularly the reaction temperature and residence time, titanium dioxide powders having a range of anatase phase compositions and specific surface areas can be formed thereby making them useful for a very wide variety of end uses. When the titanium dioxide materials are to be used as catalysts in photocatalysis (photooxidation) reactions, the materials should have a high anatase phase content and a relatively high surface area. Preferred titanium dioxide materials for use in photocatalysis reactions contain at least about 80% anatase phase (up to about 100% anatase phase is possible using the reaction of the present invention) and a specific surface area of at least about 100 $m^2/gm$ (preferably from about 100 to about 200 $m^2/gm$, most preferably from about 110 to about 175 $m^2/gm$).

The following examples, which are meant to be illustrative only and are not intended to restrict the scope of the present invention, illustrate the process and the products of the present invention.

EXAMPLES

Example 1

A diffusion flame reactor is used for synthesis of titanium dioxide powders by $TiCl_4$ oxidation/hydrolysis. The reactor consists of five concentric quartz tubes 1 mm thick. The diameter of the central tube is 2 mm and the spacing between successive tubes is 1 mm.

Dry argon gas (Wright Brothers, 99.8%) is bubbled through a gas-washing bottle containing titanium tetrachloride (Aldrich, 99.9%) (temperature=293K) and is directed through the central tube of the flame reactor. Air and methane are passed through the second and third tubes of the reactor, respectively. Titanium dioxide particles produced by hydrolysis and oxidation of $TiCl_4$ in the flame are thermophoretically collected on a 4"×4" stainless steel plate. The plate is located 5 cm above the mouth of the reactor.

A constant Ar flow rate of 200 $cm^3$/min through the $TiCl_4$ bubbler is used. The corresponding molar flow rate of $TiCl_4$ is $1.4 \times 10^{-4}$ mol/min. A mass flow controller (MKS Instruments, Inc.) is used to measure the flow rate of the argon stream through the $TiCl_4$ bubbler. Rotameters are used for measuring the air, methane and $Ar/SiCl_4$ flows. A 0.015" gauge Pt-Rh thermocouple (Omega Engineering) insulated with a mullite sheath is used for measuring the flame temperature.

The phase composition of the collected particles is determined by X-ray diffraction (XRD) in a Siemens D500 diffractometer using $CuK_\alpha$ radiation. The weight fractions of the rutile and anatase phases in the samples are calculated from the relative intensities of the strongest peaks corresponding to anatase ($2\theta=25.6$ for the (101) reflection of anatase) and rutile ($2\theta=27.5$ for the (110) reflection of rutile) peaks as described by Spurr and Myers, Quantitative Analysis of Anatase-Rutile Mixtures with an X-ray Diffractometer, Analytical Chem., 29: 760 (1957). The specific surface area of the powders is determined by nitrogen adsorption (Gemini 2360, Micromeritics) at 77K with the BET method. Transmission Electron Microsopy (TEM) in a Phillips CM20 instrument is used for morphological analysis of the powders.

Titanium dioxide powders are synthesized at four flame conditions shown in Table 1, below, together with the corresponding measured flame temperatures and residence times. Table 2 shows the specific surface areas of the powders produced, as well as the rutile and anatase contents of those powders. Powders produced at the various flame conditions are designated as F1, F2, F3 and F4. Powder F1 has the lowest specific surface area (35 $m^2/g$) because of the longer residence time of the particles in the flame. Long residence times at the high flame temperatures cause coalescence of the newly formed aggregates, resulting in larger primary particles and, consequently, loss of specific surface area. Short residence times and low flame temperatures, on the other hand, favor the formation of smaller primary particles resulting in high surface area powders. Powder F1 has the highest rutile content (13%) of the powders made, while powders F2 and F3 contain very little rutile phase and powder F4 is almost completely anatase. The powder F4, because of its high surface area and its very high anatase content, is an excellent photocatalyst, for example, in the photooxidation of phenol.

TABLE 1

| Flame # | $CH_4$ Flow Rate ($cm^3$/min) | Air Flow Rate (l/min) | Flame Temperature (K.) | Residence Time × $10^{-3}$ sec |
|---|---|---|---|---|
| 1 | 160 | 0.500 | 1178 | 277 |
| 2 | 208 | 1.174 | 1300 | 136 |
| 3 | 277 | 1.433 | 1340 | 122 |
| 4 | 277 | 2.314 | 1440 | 75 |

TABLE 2

| Powder | BET Area (m²/g) | Rutile Content (wt %) | Anatase Content (wt %) |
|---|---|---|---|
| F1 | 35 | 13 | 87 |
| F2 | 54 | 7 | 93 |
| F3 | 78 | 6.5 | 93.5 |
| F4 | 110 | <0.1 | >99.9 |

Photocatalytic experiments are performed using the F4 titanium dioxide prepared above as the catalyst and phenol as the target molecule. Aqueous solutions of phenol of initial nominal concentration of 1 mM are employed. The reactor working volume is 600 cm³. The pH of the solutions is controlled at 3.5 in the beginning of the reaction. The UV-light source used is a 450 W medium pressure, mercury vapor, quartz lamp (Hanovia). The lamp is placed inside a quartz cooling jacket immersed in the solution inside the reaction vessel. The $TiO_2$ powder concentration in the solution is 0.5 g/L. The temperature of the solution is controlled in the range 35°–40° C. The concentration of phenol in the solution is monitored for a period of 120 minutes with a UV-light spectrophotometer.

A 50% reduction of phenol concentration is obtained in less than 2 hours without bubbling oxygen in the solution when the F4 titanium dioxide powder is used. This represents excellent photocatalysis performance.

Irradiation of $TiO_2$ particles with UV light in the wavelength range of 300–400 nm provides pairs of holes and electrons. These react with adsorbed species on the titanium dioxide surface and form reactive hydroxyl radicals. The latter oxidize phenol according to the following reaction:

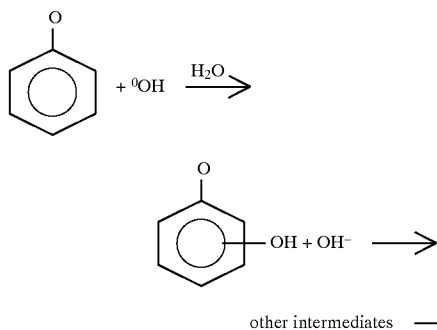

Example 2

Using the apparatus and the analytical methods described in Example 1 silicon-doped titanium dioxide is prepared as follows. Argon gas is bubbled through $SiCl_4$ (Aldrich, 99.9%) in a gas-washing bottle and is mixed with the $TiCl_4$ laden argon stream. The temperature of the $SiCl_4$ and argon flow rate can be varied to vary the $SiCl_4$ concentration. The $Ar/TiCl_4$ and $Ar/SiCl_4$ streams are premixed before they are introduced into the flame. The gas mixture is carried into the flame for the reaction. The vapor pressure of $SiCl_4$ at room temperature is much higher than that of $TiCl_4$. In order to introduce small amounts, the temperature of $SiCl_4$ is maintained at −11°±1° C. using ice-sodium chloride mixture. The concentrations of $TiCl_4$ and $SiCl_4$ in the gas stream are determined by recording the weight of the halides before and after each experiment that is carried out while argon is bubbled through the halide at constant flow rate. For example, the $SiCl_4/TiCl_4$ molar ratio in the reaction area (based on mol % of $TiCl_4$), is 5%, 10%, 15% and 20%. The rutile content of the powders obtained in such a reaction tends to decrease by increasing the amount of $SiCl_4$ introduced into the flame. Hence, doping with Si can be used, with appropriate process conditions and controls, to increase the anatase content and specific surface area of the titanium dioxide powders formed, thereby increasing the ability of those powder to act as photocatalyst.

Example 3

Using the apparatus and reaction conditions described in Example 1, $TiO_2$ is synthesized (without the use of dopants) in the presence of a corona electric field in accordance with a preferred embodiment of the present invention. In this example, the following reaction conditions are utilized:

$CH_4$ flow rate=160 cm³/min.

Air flow rate=0.5 l/min.

$TiCl_4$ molar flow rate=1.4×10⁻⁴ mol/min.

Flame temperature=1178K

Residence Time=0.05–0.2 second (average≈0.1 second)

The needle electrodes used to generate the corona discharge are made of stainless steel, are 5 cm in length and come to a sharp point (50–100 μm in diameter) at one end. For a unipolar corona discharge, one electrode is connected to the power supply and the other electrode is connected to the ground. For a bipolar corona discharge, one electrode is connected to the positive DC power supply and the other electrode is connected to the negative DC power supply. The power supplies used are manufactured by Spellman and by Gamma High Voltage, Inc. The electrodes are positioned horizontally, 1 cm above the mouth of the burner. The distance between the electrodes is 4 cm and the tip of each electrode is about 6 mm away from the flame. A corona is observed between the electrodes when the applied voltage is above 4 kV. The voltage is varied between 0 and 10 kV in the context of positive, negative and bipolar fields. The titanium dioxide powder samples are collected onto a nickel plate 7 cm above the mouth of the burner. The specific surface area and rutile content of the powders formed are measured as described in Example 1. The following results are obtained.

| | Negative Polarity | | Positive Polarity | | Bipolar |
|---|---|---|---|---|---|
| Applied Voltage (kV) | Specific Surface Area (m²/g) | Rutile Content (wt. %) | Specific Surface Area (m²/g) | Rutile Content (wt. %) | Specific Surface Area (m²/g) |
| 0 | 35 | 17.5 | 35 | 17.5 | 35 |
| 4 | 44 | 17 | 42.5 | 16 | |
| 5 | 55 | 10 | 61 | | 46 |
| 6 | 72 | 9 | 70 | 7 | |
| 7 | | | | | 66 |
| 8 | 73 | 6 | 75 | 7 | |
| 9 | 74 | 7.5 | | | |
| 10 | | | 76 | 6.5 | |

Example 4

A premixed flame reactor is used for the synthesis of silica and tin oxide powders by the oxidation/hydrolysis of their respective halides ($SiCl_4$ or $SnCl_4$). $SiCl_4$ is kept at 273K due to its high vapor pressure and $SnCl_4$ is kept at room temperature (293K). The reactor is made of alumina with an inside diameter of 0.5" (1.27 cm). The reactants (methane, air and the carrier gas Argon with the precursor) are mixed before they enter the flame. The needle electrodes are placed at 0.1 and 1.0 cm from the tip of the burner. The distance between the tips of the needles is fixed at 4 cm. The corona between the needles is created using a positively polar DC power supply (Spellman). The powders are collected on a glass fiber filter (Gelman Scientific) positioned at 11.5 cm from the tip of the reactor. The specific surface area of silica and titania powders is obtained as described in Example 1. The experimental conditions and the results obtained are shown below:

Methane: 237 cm$^3$/min

Air: 1095 cm$^3$/min

Argon: 200 cm$^3$/min

Silica
Precursor (SiCl$_4$) flow rate: 8.3 × 10$^{-4}$ mol/min

| | Specific surface area, m$^2$/g | |
|---|---|---|
| | Needle position from the burner tip | |
| Potential, kV | 0.1 cm | 1.0 cm |
| 0 | 129 | 129 |
| 5 | | 127 |
| 6 | 171 | 144 |
| 7 | 215 | |
| 8 | 215 | 207 |
| 9 | | 219 |

Tin oxide
Precursor (SnCl$_4$) flow rate 2.6 × 10$^{-4}$ mol/min

| | Specific surface area, m$^2$/g | |
|---|---|---|
| | Needle position from the burner tip | |
| Potential, kV | 0.1 cm | 1.0 cm |
| 0 | 13 | 13 |
| 5 | 13 | 14 |
| 6 | 16 | 13 |
| 8 | 19 | 16 |
| 9 | 23 | 16 |
| 10 | 34 | 17 |
| 11 | | 18 |

What is claimed is:

1. In a process for forming ceramic particles in a vapor phase flame reaction the improvement comprising forming a corona discharge electric field between needle electrodes positioned across the reaction area where the reaction takes place and the particles are formed.

2. A process according to claim 1 wherein ceramic particles selected from the group consisting of silica, titania, alumina, zirconia, zinc oxide, tin oxide, germania, borides, nitrides, carbides and mixtures thereof are formed.

3. A process according to claim 2 wherein the ceramic particles formed are selected from the group consisting of silica, titania and tin oxide.

4. A process according to claim 3 wherein the distance between said electrodes is from about 30 to about 60 mm.

5. A process according to claim 4 wherein the corona discharge electric field has a voltage of from about 4 to about 12 kV.

6. A process according to claim 5 wherein the reaction is carried out in a reactor selected from the group consisting of premixed flame reactors, turbulent flame reactors and laminar diffusion flame reactors.

7. A process according to claim 1 wherein the direction of the electric field is approximately perpendicular to the flow of the reactants.

* * * * *